(12) United States Patent
Werner et al.

(10) Patent No.: US 7,021,604 B1
(45) Date of Patent: Apr. 4, 2006

(54) IRIS VALVE FOR CONTROL OF BULK SOLIDS

(75) Inventors: Shawn Michael Werner, Salina, KS (US); Harmon Lee Davis, Brookville, KS (US); Monty Richard Leach, Salina, KS (US)

(73) Assignee: Salina Vortex Corporation, Salina, KS (US)

( * ) Notice: Subject to any disclaimer, the term of this patent is extended or adjusted under 35 U.S.C. 154(b) by 0 days.

(21) Appl. No.: 10/966,732

(22) Filed: Oct. 15, 2004

(51) Int. Cl.
*F16K 7/04* (2006.01)
(52) U.S. Cl. .......................................... 251/212; 251/4
(58) Field of Classification Search .................... 251/4, 251/212
See application file for complete search history.

(56) References Cited

U.S. PATENT DOCUMENTS

| | | | | |
|---|---|---|---|---|
| 2,835,272 | A | * 5/1958 | Taupin | 137/614.13 |
| 3,383,131 | A | * 5/1968 | Rosfelder | 294/68.21 |
| 5,449,141 | A | 9/1995 | Gillett et al. | |
| 2005/0092944 | A1* | 5/2005 | Patterson | 251/4 |

OTHER PUBLICATIONS

Brochures for FMC Technologies on Iris Flow Control Valve information located at www.levyindustrial.com/fmc/prode. htm; SFV and DFV Series Specifications, p. 5; FV Series Specifications, p. 4 (2 pages); (note the effective date of the publication is more than one year prior to the filing date of this application.).
Brochures for Control Automation Pty. Limited on Cadcon Valves located at http://www.kockumsbulk.com.au/brochures/Cadcon%20Brochure.pdf (3 pages); (note the effective date of the publication is more than one year prior to the filing date of this application.).
Brochure for Kemutec Powder Processing Solutions on Powder Processing Solutions located at www.kemutec.com/htm/products/mucon/valves/idv/ad.htm (3 pages); (note the effective date of the publication is more than one year prior to the filing date of this application.).

* cited by examiner

*Primary Examiner*—J. Casimer Jacyna
(74) *Attorney, Agent, or Firm*—J. David Wharton; Stinson Morrison Hecker LLP

(57) ABSTRACT

An iris valve for controlling the flow of bulk solid materials includes a flexible cylindrical sleeve, a control ring, and a polymeric isolator disc, all sandwiched between upper and lower body members. Rotating the control ring twists the flexible sleeve in an iris pattern to close an opening through the valve. Clamp bands attached to the upper body member and control ring include a machined helical pattern to securely grip the ends of the flexible sleeve, and a threaded handle locks the control ring in place against the body members.

22 Claims, 4 Drawing Sheets

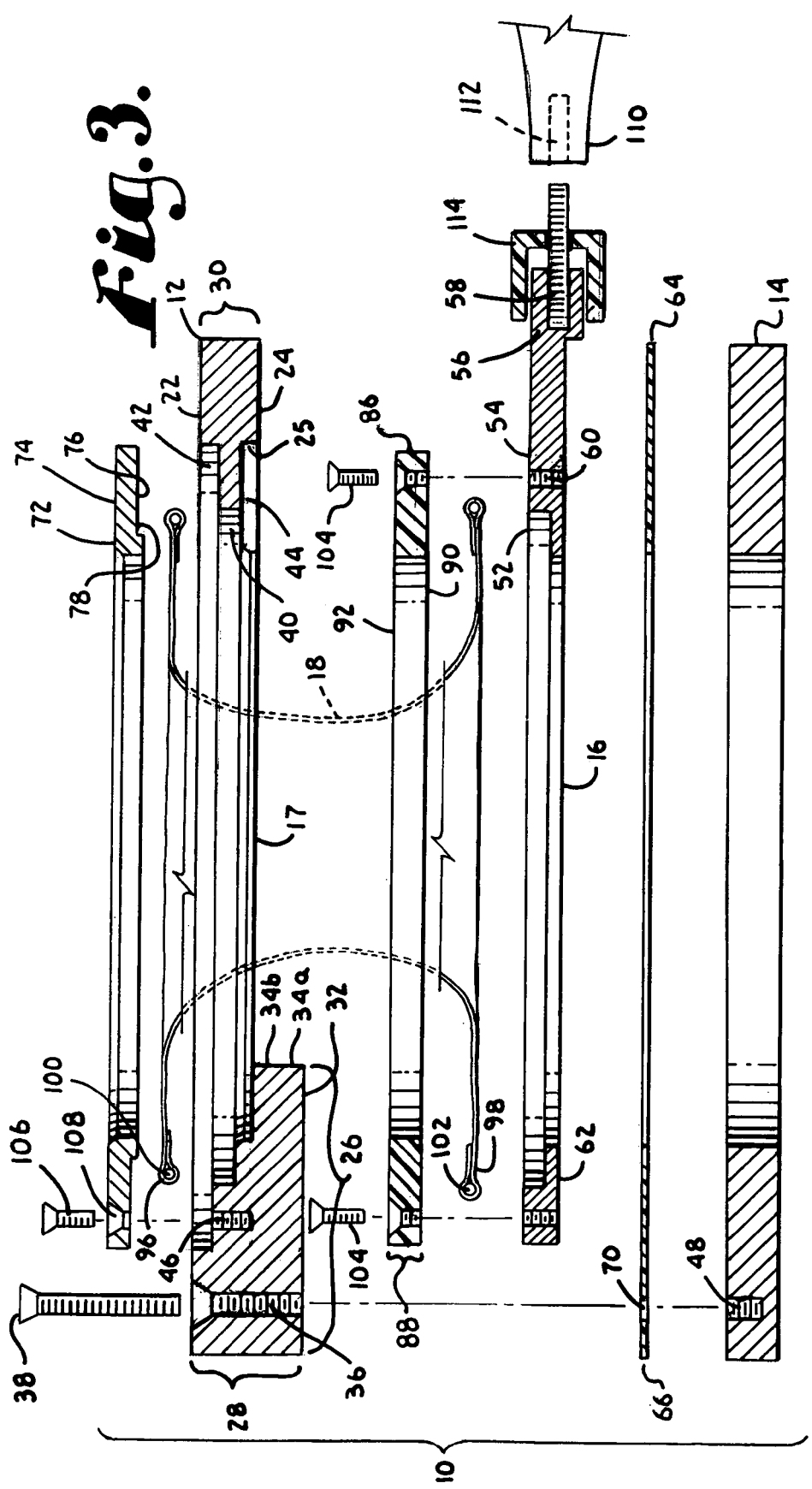

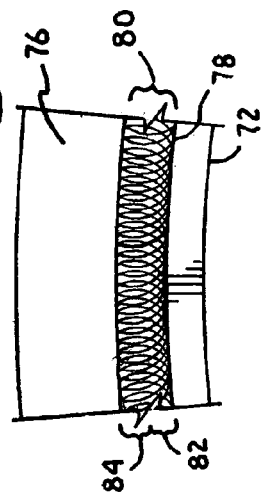
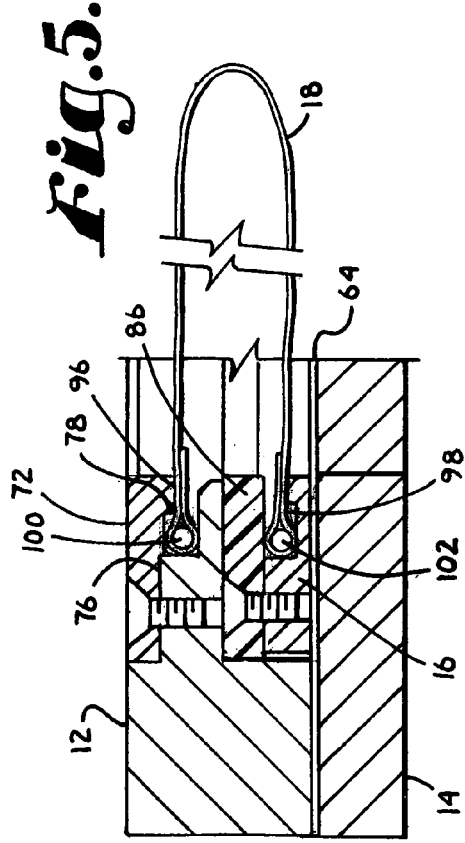
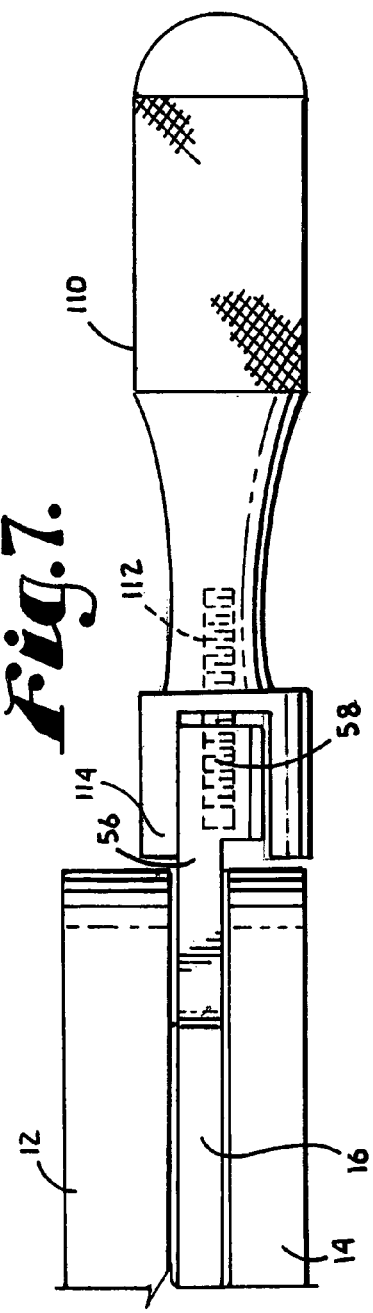
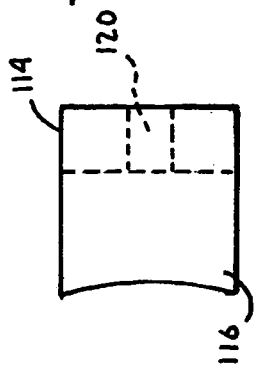
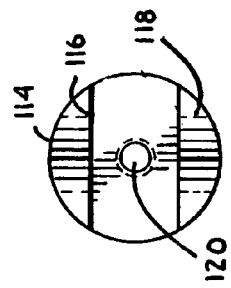

IRIS VALVE FOR CONTROL OF BULK SOLIDS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to valves, and more particularly to iris valves used in the control of flow of bulk solids.

2. Description of Related Art

Various valves are used in manufacturing and production facilities to control the flow of materials within the facility, or within systems in the facility. In food handling and other bulk solid material handling fields, for example, valves are used to direct and control the flow of bulk solids to particular machines or particular areas.

Iris valves, employing a flexible sleeve to close the valve opening, are often used in bulk material handling applications since the flexible sleeves cannot damage material passing through the valve. Similarly, the flexible sleeve allows the iris valve to be used in close proximity to bags of bulk material without the danger of damaging the bags.

Current iris valve designs, however, suffer from several drawbacks. For example, for sanitary reasons, all stainless steel construction is preferred in food handling and pharmaceutical handling applications. However, the metal-to-metal contact of the rotating valve parts results in galling of the metal surfaces of the valve, which in turn causes the valve to stick and become difficult to operate. Designs using combinations of bronze and aluminum parts and designs using plastic parts have been introduced to reduce the galling problem, but each suffers from its own drawbacks.

Using bronze and aluminum, alone or in combination, reduces, but does not eliminate, the galling problem. In addition, neither bronze nor aluminum are as strong as stainless steel and do not have the desirable sanitary properties of stainless steel. Rotational parts made of plastic have also been used to avoid the galling problem associated with all-metal construction, however, over time the plastic tends to become brittle and subject to fatigue and breakage.

Thus, there remains a need in the art for an iris valve that incorporates the strength and durability of stainless steel, but is not subject to the galling problems associated with conventional metal-to-metal valve designs.

BRIEF SUMMARY OF THE INVENTION

The present invention is directed to an iris valve having a metal control ring sandwiched between metal upper and lower body members. A flexible cylindrical sleeve is attached at opposite ends to the upper body member and control ring, respectively. A metal clamp band having a machined gripping pattern secures one end of the flexible sleeve to the upper body member, while a polymer clamp band having a machined gripping pattern secures the opposite end of the flexible sleeve to the control ring. A polymeric isolator ring separates the control ring from the lower body member. A handle projecting from the control ring allows rotating the control ring to in turn rotate the lower end of the flexible sleeve relative to its upper end, causing the flexible sleeve to twist in an iris pattern, thus closing the opening through the valve. The polymer clamp band and polymeric isolator disc separate the surfaces of the control ring from the upper and lower body members, respectively, allowing the control ring to move easily and eliminating metal-to-metal contact of the rotational pieces of the valve.

In one exemplary embodiment, the valve includes an upper body member having an annular groove around its upper surface, with a metal clamp band attached to the upper body member, covering the annular groove. A control ring having an annular groove around its upper surface and a projecting handle is positioned below the upper body member, with a polymer clamp band affixed to the control ring to cover the annular groove and to separate the control ring from the upper body member.

A flexible cylindrical sleeve, having annular pockets at each end, each encompassing a metal ring or sleeve loop, extends between the upper body member and control ring, through the polymer clamp band. The upper annular pocket and encompassed sleeve loop is captured between the metal clamp band and the upper body member, positioned in the annular groove on the upper body member. The lower annular pocket and encompassed sleeve loop is captured between the polymer clamp band and the control ring, positioned in the annular groove on the control ring. A polymeric isolator disc is positioned below the control ring, with a lower body member attached to the upper body member to sandwich the polymer clamp band, lower sleeve loop and encompassed metal ring, control ring, and polymeric isolator disc between the two body members.

Rotating the control ring rotates one end of the flexible sleeve, which is secured to the control ring by the polymer clamp band, relative to the other end of the flexible sleeve, which is secured to the upper body member by the metal clamp band. The rotation twists the flexible sleeve in an iris pattern to close the opening in the valve. The polymeric isolator disc and larger diameter polymer clamp band separate the horizontal and vertical surfaces of the control ring from the metal surfaces of the upper and lower body members, respectively, and allow the control ring to move easily without galling or metal-to-metal contact. Helical gripping patterns machined on the lower surfaces of the metal clamp band and polymer clamp band ensure that the annular pockets and encompassed sleeve loops at opposite ends of the flexible sleeve are securely affixed within the annular grooves on the upper body member and control ring.

The control ring includes a protruding threaded shaft which extends through a locking collar and into an internally threaded knob. Rotating the threaded knob on the protruding threaded shaft tightens the locking collar against the upper and lower body members to secure the control ring in place. Rotating the internally threaded knob in the opposite direction on the protruding threaded shaft loosens the locking collar, allowing the control ring to be rotated.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 3 is an exploded, side view of the iris valve of FIG. 1.

FIG. 5 is a side, partial view of an outer edge of the iris valve of FIG. 1.

FIG. 6 is a plan, partial view of the metal clamp band of the iris valve of FIG. 1

FIG. 7 is a partial side view of the projecting handle of the iris valve of FIG. 1.

FIG. 8 is an end view of the locking collar of the projecting handle of the iris valve of FIG. 1.

FIG. 9 is a top view of the locking collar of the projecting handle of the iris valve of FIG. 1.

DETAILED DESCRIPTION OF EXEMPLARY EMBODIMENTS

An iris valve according to an exemplary embodiment of the present invention is depicted in FIGS. 1 through 9. While the invention will be described in detail hereinbelow with reference to this embodiment, it should be understood that the invention is not limited to the specific constructions or configurations shown in the exemplary embodiment. Rather, one skilled in the art will appreciate that a variety of configurations may be implemented in accordance with the present invention.

Figure 2:
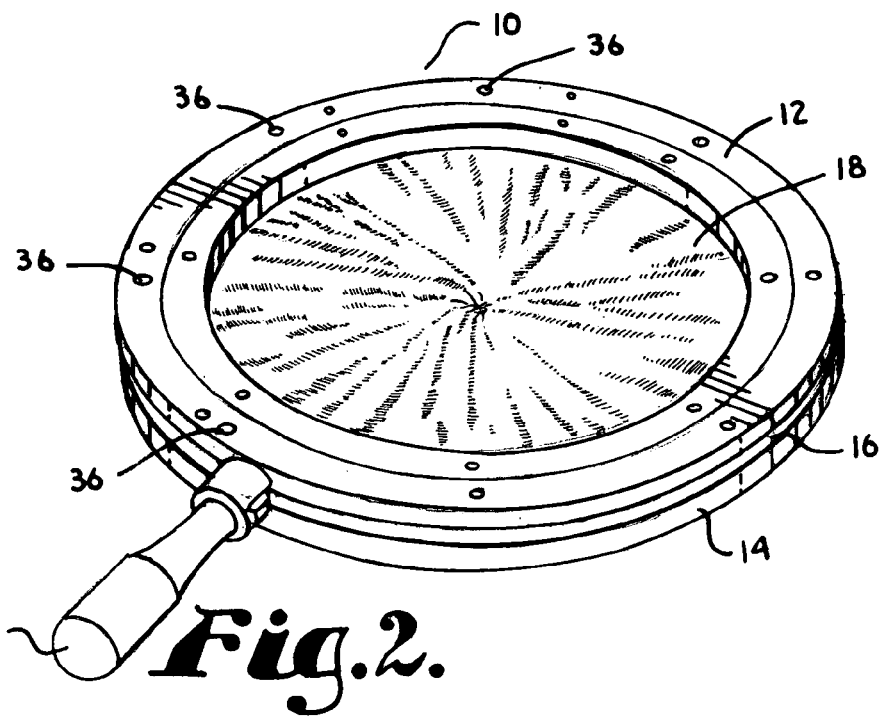
FIG. 2 is a perspective view of the iris valve of FIG. 1 in its closed position.
Figure 1:
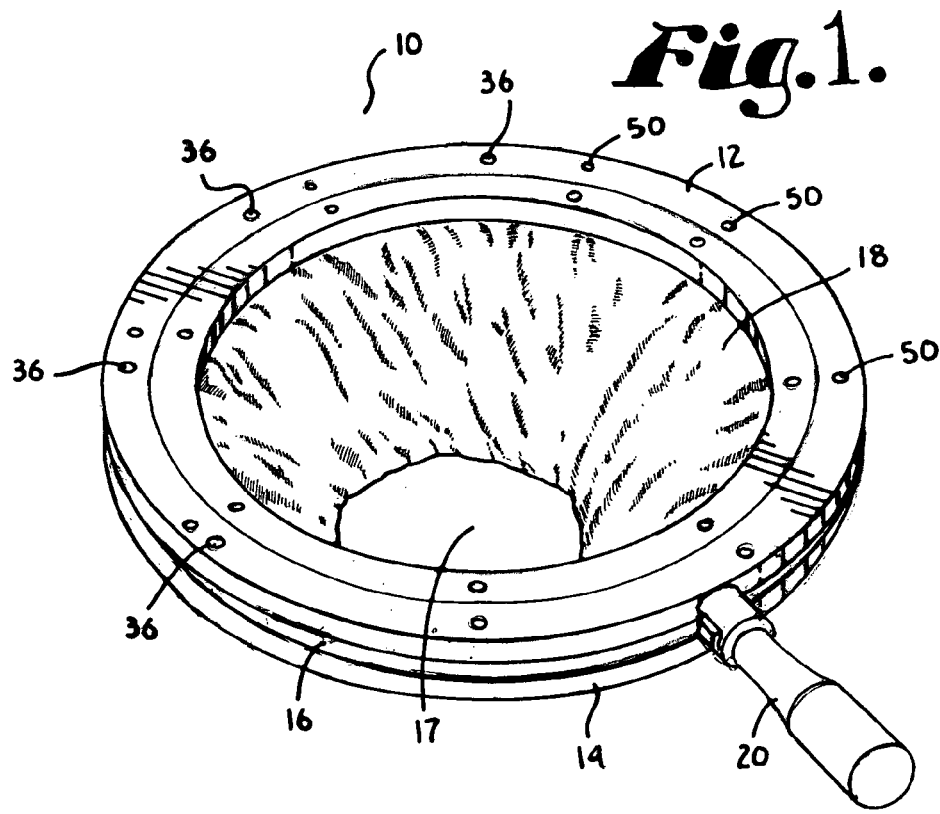
FIG. 1 is a perspective view of an exemplary embodiment of an iris valve in accordance with the present invention in its open position.

Looking first to FIGS. 1 and 2, an iris valve in accordance with an exemplary embodiment of the present invention is depicted generally by the designation 10. Iris valve 10 includes a generally cylindrically shaped upper body member 12 attached to a generally cylindrically shaped lower body member 14, with a control ring 16 sandwiched therebetween. A valve opening 17, through which solid material passes when the valve is in use, is defined by the openings through upper body 12, lower body 14, and control ring 16. A flexible cylindrical sleeve 18 is affixed at one end to upper body member 12 and is secured at the opposite end to control ring 16. A projecting handle 20 extends from control ring 16, allowing control ring 16 be rotated so that the end of flexible sleeve 18 affixed to control ring 16 rotates with respect to the end of flexible sleeve 18 affixed to upper body member 12. Thus, by rotating control ring 16, flexible sleeve 18 can be twisted from an open position, as shown in FIG. 1, to a closed position, as shown in FIG. 2, where flexible sleeve 18 twists into an iris pattern, closing valve opening 17 through upper and lower body members 12, 14.

Figure 4:
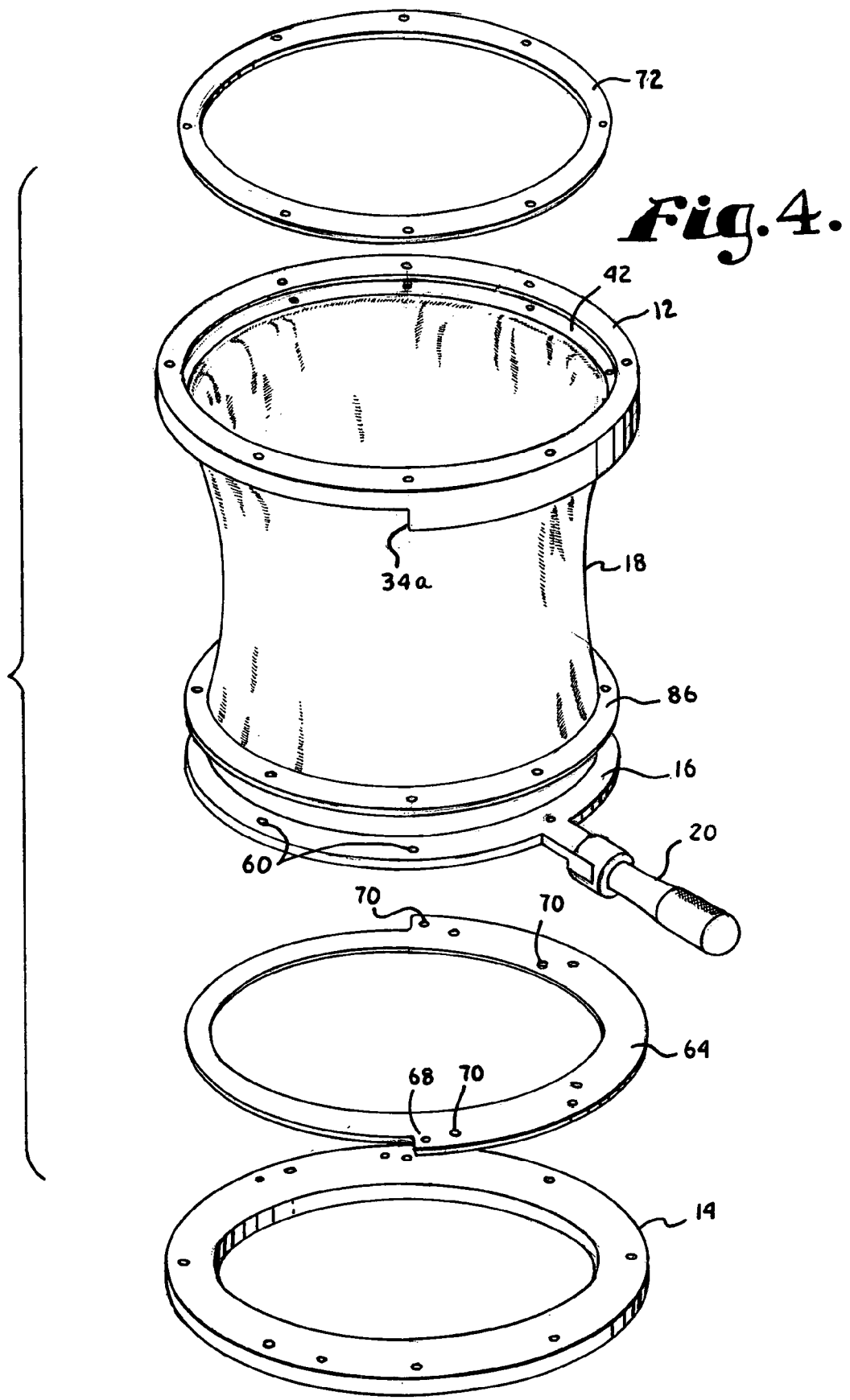
FIG. 4 is an exploded, perspective view of the iris valve of FIG. 1.

Looking also to FIGS. 3, 4, and 5 upper body member 12 includes an upper surface 22 and a lower surface 24. A portion of upper body member 12 is cut away so that a first portion 26 of upper body member 12 has a thickness 28 that is greater than the thickness 30 of the remaining portion, so that the lower surface 32 of first portion 26 is a greater distance from upper surface 22 than lower surface 24 of the remaining portion. Thus, when placed onto a flat mating surface so that lower surface 32 of first portion 26 is parallel to the mating surface, a gap exists between the mating surface and the lower surface 24 of the remaining portion. The perpendicular transitions between first portion 26 and the remaining portion form handle stops 34a, 34b on opposing sides of upper body member 12, which serve as mechanical stops to a handle extending from a rotating piece moving in the gap between upper body member 12 and a mating surface. Four apertures 36 through first portion 26 of upper body member 12 allow fasteners 38 to attach upper body member 12 to lower body member 14.

Two concentric, innermost and outermost stepped annular grooves 40, 42 extend around upper surface 22 of upper body member 12, with innermost groove 40 adjacent valve opening 17 and outermost groove 42 adjacent innermost groove 40. Annular grooves 40, 42 are at different depths from upper surface 22 of upper body member 12, with outermost groove 42 being at an intermediate depth and innermost groove 40 being the deepest so that in cross-section the progression from upper surface 22 to innermost groove 40 resembles stair steps. Threaded apertures 46 are spaced evenly around, and extend into, outermost annular groove 42, while innermost annular groove 40 is relatively smooth, with no apertures. An annular groove 44 on lower surface 24 of upper body member 12 extends around the underside of upper body member 12, adjacent valve opening 17, forming a vertical surface 25 on the underside of upper body member 12.

Cylindrically-shaped lower body member 14 includes an opening through its center corresponding in size to valve opening 17 through upper body member 12. Lower body member 14 includes four threaded apertures 48, corresponding to fastener apertures 36 through first portion 26 of upper body member 12, allowing threaded fasteners 38 to attach upper body member 12 to lower body member 14. Additional apertures 50 through upper body member 12 and lower body member 14 allow either or both body members to be attached to machinery, equipment, or other valves as necessary.

Control ring 16 is a cylindrically-shaped, flat disc, with a circular opening through its center corresponding in size to valve opening 17 of upper body member 12. Control ring 16 includes an annular groove 52 around its upper surface 54, with a protruding handle 56 having a threaded shaft 58 extending therefrom. A series of threaded apertures 60 are spaced around upper surface 54, extending through control ring 16 from upper surface 54 to lower surface 62.

Upper body member 12, lower body member 14, and control ring 16 are preferably made from a strong metal, such as stainless steel or high strength aluminum alloys. Most preferably, they are made from stainless steel, which provides strength and durability along with easy to clean surfaces.

Polymeric isolator disc 64 is a relatively thin, flat disc, having a thickness 66, with a circular opening through its center corresponding in size to valve opening 17 of upper body member 12. An integral flange portion 68 extends outwardly circumferentially from a portion of polymeric isolator disc 64 so that flanged portion 68 of polymeric isolator disc 64 corresponds in size to first portion 26 of upper body member 12. Apertures 70 through polymeric isolator disc 64 correspond to fastening apertures 36 in first portion 26 of upper body member 12 and threaded apertures 48 in lower body member 14, so that with polymeric isolator disc 64 placed between upper and lower body members 12, 14, fasteners 38 pass through apertures 70 in polymeric isolator disc 64, allowing upper body member 12 to be secured to lower body member 14. Polymeric isolator disc is preferably made from a polymeric material, and is most preferably a plastic. Polymeric isolator disc 64 is not load bearing, but simply provides a low-friction contact surface between control ring 16 and lower body member 14, preventing metal-to-metal contact between the two.

Metal clamp band 72 is a cylindrically-shaped, flat disc with a circular opening through its center corresponding in size to valve opening 17 of upper body member 12. Metal clamp band 72 has an upper surface 74 and a lower surface 76, with a raised lip 78 protruding from lower surface 76 and extending circumferentially adjacent the center opening. As best seen in FIG. 6, a machined pattern 80 of helical coils extends annularly around lower surface 76, adjacent raised lip 78. The continuous series of helical loops creates a crosshatch portion 82 of pattern 80 where the lines leading to and from adjacent coils overlap, and a coil portion 84 of the pattern where the loop portion of the helical coils are aligned annularly around lower surface 76 of metal clamp band 72. Crosshatch portion 82 of the pattern provides multiple gripping points to securely engage any surface in contact with that portion.

Returning to FIGS. 3, 4, and 5, polymer clamp band 86 is a cylindrically-shaped, substantially flat disc having a thickness 88, with a circular opening through its center corresponding in size to valve opening 17 of upper body member 12. Polymer clamp band 86 includes a lower surface 90, and an upper surface 92, with a machined pattern of helical coils extending annularly around lower surface 90. The helical coil pattern on lower surface 90 is identical to helical pattern 80 on metal clamp band 72, with a crosshatch portion and a coil portion. Polymer clamp band 86 is preferably a polymeric material, most preferably plastic. The thickness of polymer clamp band 86 is preferably substantially greater than the thickness of polymeric isolator disc 64, since polymer clamp band 86 is a load bearing component subject to torsional forces as iris valve 10 is operated.

Flexible cylindrical sleeve 18 in its fully extended position is a hollow cylinder, with annular pockets 96, 98 formed at opposite ends of the cylinder by folding over the ends of the cylinder and stitching them to the cylinder body. Small slits in each annular pocket 96, 98, allow a circular metal support ring or sleeve loop to be inserted into each pocket to hold each end of flexible sleeve 18 open. Preferably, flexible sleeve 18 comprises a strong, flexible material. Most preferably, flexible sleeve 18 is made of durable flexible fabric.

Upper and lower sleeve loops 100, 102 are circular metal rings that are inserted into annular pockets 96, 98, respectively to support the ends of flexible sleeve 18. A break in each sleeve loop allows the loop to be inserted into the slit in annular pockets 96, 98 of flexible sleeve 18. Upper sleeve loop 100 is sized so that its diameter is substantially the same as the diameter of innermost annular groove 40 on upper body member 12, while lower sleeve loop 102 is sized so that its diameter is substantially the same as the diameter of annular groove 52 on control ring 16. Preferably, upper and lower sleeve loops 100, 102 are made from a solid metal rod to provide strength and durability. Of course, variations on this exemplary embodiment are within the scope of the present invention. For instance, upper and lower sleeve loops 100, 102 may be continuous loops with no breaks, and may be sewn or fixed in place at the ends of flexible sleeve 18.

Looking still to FIGS. 3, 4, and 5, the assembled valve includes polymeric isolator disc 64 placed on top of lower body member 14, with fastening apertures 70 through polymeric isolator disc 64 aligned with threaded apertures 48 on lower body member 14. Control ring 16 is positioned on top of polymeric isolator disc 64 so that lower surface 62 of control ring 16 contacts the upper surface of polymeric isolator disc 64. Lower sleeve loop 102, encompassed by annular pocket 98 of flexible sleeve 18, is positioned within annular groove 52 in the upper surface 54 of control ring 16, thus holding the lower end of flexible sleeve 18 in place in annular groove 52.

Polymer clamp band 86 is positioned on top of control ring 16 so that it covers annular groove 52 on control ring 16, and so that the helical pattern on lower surface 90 of polymer clamp band 86 contacts lower annular pocket 98 of flexible sleeve 18, which encompasses lower sleeve loop 102. Fasteners 104 attach polymer clamp band 86 to control ring 16, trapping lower sleeve loop 102 and lower annular pocket 98 between polymer clamp band 86 and control ring 16. Properly tightened, fasteners 104 securely sandwich annular pocket 98 and lower sleeve loop 102 in annular groove 52, with the helical pattern on lower surface 90 of polymer clamp band 86 providing a secure frictional grip between lower annular pocket 98 and polymer clamp band 86. Preferably, the crosshatch portion of the helical pattern on polymer clamp band 52 contacts lower annular pocket 98. Thus secured to control ring 16, the lower end of flexible sleeve 18 will move with control ring 16.

Upper sleeve loop 100, captured within upper annular pocket 96 of flexible sleeve 18, is positioned within innermost annular groove 40 in the upper surface of upper body member 12, thus holding the upper end of flexible sleeve 18 in place in annular groove 40. Metal clamp band 72 is positioned in outermost annular groove 42 on upper surface 22 of upper body member 12 so that it covers innermost annular groove 40 and so that helical pattern 80 on lower surface 76 of metal clamp band 72 contacts upper annular pocket 96 of flexible sleeve 18, which encompasses upper sleeve loop 100. Fasteners 106 inserted through apertures 108 in metal clamp band 72 and into threaded apertures 46 in outermost annular groove 42 of upper body member 12 attach metal clamp band 72 to upper body member 12, trapping upper annular pocket 96 and encompassed upper sleeve loop 100 between metal clamp band 72 and upper body member 12. Properly tightened, fasteners 106 securely sandwich upper annular pocket 96 and upper sleeve loop 100 in innermost annular groove 40, with helical pattern 80 on lower surface 76 of metal clamp band 72 providing a secure frictional grip between upper annular pocket 96 and metal clamp band 72. Preferably, crosshatch portion 82 of helical pattern 80 on metal clamp band 72 contacts upper annular pocket 96. Raised lip 78 of metal clamp band 72 additionally prevents lateral movement of upper sleeve loop 100. Thus secured to upper body member 12, the upper end of flexible sleeve 18 is held stationary, affixed to upper body member 12.

First portion 26 of upper body member 12 is positioned on polymeric isolator disc 64 so that it covers the flanged portion 68 of polymeric isolator disc 64, and so that fastener apertures 36 of upper body member 12 align with apertures 70 in polymeric isolator disc 64 and threaded fastener apertures 48 in lower body member 14. Polymer clamp band 86 is positioned within annular groove 44 on lower surface 24 of upper body member 12 so that upper surface 92 of polymer clamp band 86 contacts the face surface of annular groove 44. Fasteners 38 inserted though upper body member 12 and polymeric isolator disc 64 secure upper body member 12 to lower body member 14. When assembled as such, polymer clamp band 86, lower sleeve loop 102, control ring 16, and polymeric isolator disc 64 are trapped between upper and lower body members 12, 14. Protruding handle 56 protrudes out of the gap between upper body member 12 and lower body member 14 so that control ring 16 can be rotated while trapped between upper and lower body members 12, 14. Polymer clamp band 86, trapped within annular groove 44 on lower surface 32 of upper body member 12 and affixed to control ring 16, keeps control ring 16 trapped between upper and lower body members 12, 14. Polymer clamp band 86 and polymeric isolator disc 64 separate the upper and lower surfaces 54, 62 of control ring 16 from upper body member 12 and lower body member 14, respectively. Polymer clamp band 86 additionally contacts vertical surface 25 of upper body member 12, providing a polymer bearing surface against vertical surface 25, with no metal-to-metal contact.

Looking now to FIG. 7, protruding handle 56 of control ring 16 comprises a threaded shaft 58 extending therefrom and through locking collar 114. Knob 110 has a threaded internal aperture 112 extending axially into one end and configured to engage threaded shaft 58. As seen in FIGS. 7, 8, and 9, locking collar 114 is a cylindrically-shaped piece, with a rectangular section removed from one end so that locking collar 114 has a generally "U" shaped cross-sectional profile. Locking collar 114 thus has upper and lower protruding tines 116, 118, spaced apart so that they fit over threaded shaft 58 protruding from control ring 16, and an aperture 120 through which threaded shaft 58 passes. As seen best in FIG. 9, the ends of tines 116, 118 are contoured to conform to the outer circumference of upper and lower body members 12, 14. Turning knob 110 rotates internal threads 112 onto threaded shaft 58, thereby moving locking collar 114, which is adjacent and in contact with knob 110. Thus, tightening knob 110 forces locking collar 114 into frictional engagement with upper and lower body members 12, 14, preventing control ring 16 from being rotated between upper and lower body members 12, 14. Loosening knob 110 reduces or removes the frictional engagement between locking collar 114 and upper and lower body members 12, 14, allowing control ring 16 to be rotated.

In operation, with iris valve 10 configured as shown and described, control ring 16 may be rotated from a first, open position, as shown in FIG. 1, where projecting handle 20 is abutted against handle stop 34a, to a second, closed position, as shown in FIG. 2, where projecting handle 20 is abutted against handle stop 34b. With the upper end of flexible sleeve 18 secured to upper body member 12, rotating control ring 16 from a first, open position, to a second, closed position, rotates the lower end of flexible sleeve 18 with respect to the upper end, thus twisting flexible sleeve 18 into an iris position, closing valve opening 17.

Polymer clamp band 86 and polymeric isolator disc 64 separate the upper and lower surfaces 54, 62 of control ring 16 from upper body member 12, and lower body member 14, respectively. Polymer clamp band 86 additionally isolates vertical surface 25 of upper body member 12, providing a polymer bearing surface against vertical surface 25. Thus, there is no metal-to-metal contact between the rotational parts of iris valve 10, and no galling can occur. Handle 20, having knob 110 and locking collar 114, allows locking the control ring in any desired position, allowing iris valve 10 to be secured in any position between fully open and fully closed.

As can be seen, the invention described herein provides a strong, durable iris valve which overcomes problems associated with prior all metal valves, and without suffering from strength and durability problems associated with using plastic rotational parts The iris valve of the present invention provides the strength and advantages of stainless steel parts, but eliminates the disadvantages, such as galling, associated with all-metal construction by providing polymeric surfaces to separate the metal valve parts. In addition, the iris valve of the present invention provides a positive locking mechanism, allowing the valve to be securely held any position between fully open and fully closed.

Of course, other embodiments configuration will be apparent to those skilled in the art, and are contemplated by and within the scope of the present invention.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

The terms "substantially", "generally", "approximately", and "relatively" as used herein may be applied to modify any quantitative representation which could permissibly vary without resulting in a change in the basic function to which it is related. For example, polymer clamp band, described as being "substantially flat" may permissibly vary from being flat if the variance does not materially alter the capability of the invention. Likewise, the variance from any quantitative representation, such as proximate or adjacent as used herein, is permissible if the variance does not materially alter the capability of the invention.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. An iris valve for controlling the flow of bulk solid materials, said valve comprising:
    an upper body member defining an opening, said upper body member having an upper surface comprising an annular groove;
    a metal clamp band having a lower surface affixed to said upper body member such that said lower surface of said metal clamp band substantially covers said annular groove in said upper body member;
    a control ring having an upper surface and a lower surface, said upper surface comprising an annular groove, said control ring further comprising a projecting handle for rotating said control ring;
    a polymer clamp band having a lower surface affixed to said upper surface of said control ring such that said polymer clamp band substantially covers said annular groove in said control ring and separates said upper surface of said control ring from said upper body member;
    a flexible cylindrical sleeve extending between, and affixed at opposite ends to, an upper sleeve loop and a lower sleeve loop, respectively, said upper sleeve loop captured between said metal clamp band and said upper body member such that said upper sleeve loop is affixed within said annular groove of said upper body member, said lower sleeve loop captured between said polymer clamp band and said control ring such that said lower sleeve loop is affixed within said annular groove of said control ring, such that said flexible cylindrical sleeve extends from said upper body member to said control ring through said polymer clamp band;

a polymeric isolator disc adjacent said lower surface of said control ring;

a lower body member defining an opening, said lower body member adjacent said polymeric isolator disc and affixed to said upper body member such that said polymer clamp band, said lower sleeve loop, said control ring, and said polymeric isolator disc are trapped between said upper and lower body members;

wherein rotating said control ring rotates said lower sleeve loop relative to said upper sleeve loop, thereby twisting said flexible cylindrical sleeve in an iris pattern to close said opening.

2. The iris valve of claim 1, wherein said lower surface of said metal clamp band comprises a machined pattern configured to fixably grip said upper sleeve loop.

3. The iris valve of claim 2, wherein said pattern comprises a series of helical coils extending annularly around said lower surface of said metal clamp band.

4. The iris valve of claim 1, wherein said lower surface of said polymer clamp band comprises a machined pattern configured to fixably grip said lower sleeve loop.

5. The iris valve of claim 4, wherein said pattern comprises a series of helical coils extending annularly around said lower surface of said polymer clamp band.

6. The iris valve of claim 1, wherein said polymeric isolator disc separates said lower body member from said control ring.

7. The iris valve of claim 6, wherein said polymeric isolator disc comprises a polymeric material.

8. The iris valve of claim 7, wherein said polymeric material is a plastic.

9. The iris valve of claim 1, wherein said control ring comprises steel.

10. The iris valve of claim 9, wherein said steel is stainless steel.

11. The iris valve of claim 1, wherein said polymer clamp band comprises a polymeric material.

12. The iris valve of claim 11, wherein said polymeric material is a plastic.

13. The iris valve of claim 1, wherein a thickness of said polymer clamp band is greater than a thickness of said polymeric isolator disc.

14. The iris valve of claim 13, wherein a diameter of said polymer clamp band is greater than a diameter of said control ring, and wherein said polymer clamp band provides bearing surfaces between said upper body member and said control ring.

15. The iris valve of claim 1, wherein said projecting handle comprises a protruding threaded shaft.

16. The iris valve of claim 15, wherein said projecting handle further comprises:

a locking collar placed such that said threaded shaft extends therethrough, said locking collar configured to contact an outer perimeter of said upper body member and said lower body member; and a knob having internal threads configured to engage said threaded shaft;

wherein turning said knob tightens said locking collar against said upper and lower body members to prevent movement of said control ring.

17. An iris valve for controlling the flow of bulk solid materials, said valve comprising:

an upper body member defining an opening, said upper body member having an upper surface and a lower surface comprising an annular groove;

a metal clamp band having a lower surface affixed to said upper body member such that said lower surface of said metal clamp band substantially covers said annular groove in said upper body member, wherein said lower surface of said metal clamp band comprises a machined pattern;

a control ring having an upper surface and a lower surface, said upper surface comprising an annular groove, said control ring further comprising a projecting handle for rotating said control ring;

a polymer clamp band having a diameter greater than a diameter of said control ring, said polymer clamp band having a lower surface affixed to said upper surface of said control ring such that said polymer clamp band substantially covers said annular groove in said control ring and separates said upper surface of said control ring from said upper body member; wherein said lower surface of said polymer clamp band comprises a machined pattern;

a flexible cylindrical sleeve extending between, and affixed at opposite ends to, an upper sleeve loop and a lower sleeve loop, respectively, said upper sleeve loop captured between said metal clamp band and said upper body member such that said upper sleeve loop is affixed by said machined pattern on said metal clamp band within said annular groove of said upper body member, said lower sleeve loop captured between said polymer clamp band and said control ring such that said lower sleeve loop is affixed by said machined pattern on said polymer clamp band within said annular groove of said control ring, such that said flexible cylindrical sleeve extends from said upper body member to said control ring through said polymer clamp band;

a polymeric isolator disc adjacent said lower surface of said control ring; and a lower body member adjacent said polymeric isolator disc and affixed to said upper body member such that said polymer clamp band, said lower sleeve loop, said control ring, and said polymeric isolator disc are trapped between said upper and lower body members;

wherein rotating said control ring rotates said lower sleeve loop relative to said upper sleeve loop, thereby twisting said flexible cylindrical sleeve in an iris pattern to close said opening.

18. The iris valve of claim 17, wherein said pattern on said metal clamp band comprises a series of helical coils extending annularly around said lower surface of said metal clamp band.

19. The iris valve of claim 17, wherein said pattern on said polymer clamp band comprises a series of helical coils extending annularly around said lower surface of said polymer clamp band.

20. An iris valve for controlling the flow of bulk solid materials, said valve comprising:

an upper body member;

a metal clamp band affixed to said upper body member;

a control ring comprising a projecting handle for rotating said control ring;

a polymer clamp band affixed to said control ring;

a flexible cylindrical sleeve extending between, and affixed at opposite ends to, an upper sleeve loop and a lower sleeve loop, respectively, said upper sleeve loop being affixed between said upper body member and said metal clamp band, said lower sleeve loop being affixed between said polymer clamp band and said control ring;

a lower body member; and a polymeric isolator disc separating said lower body member and said control ring;

wherein said lower body member is affixed to said upper body member such that said polymer clamp band, said lower sleeve loop, said control ring, and said polymeric isolator disc are trapped therebetween such that rotating said control ring rotates said lower sleeve loop relative to said upper sleeve loop, thereby twisting said flexible cylindrical sleeve in an iris pattern to close said opening.

21. The iris valve of claim 20, wherein said polymer clamp band and said polymeric isolator disc comprise a polymeric material.

22. The iris valve of claim 20, wherein said control ring comprises stainless steel.

* * * * *